May 12, 1931.　　　　O. ERF　　　　1,804,602
PROCESS OF TREATING HAY
Filed July 18, 1927
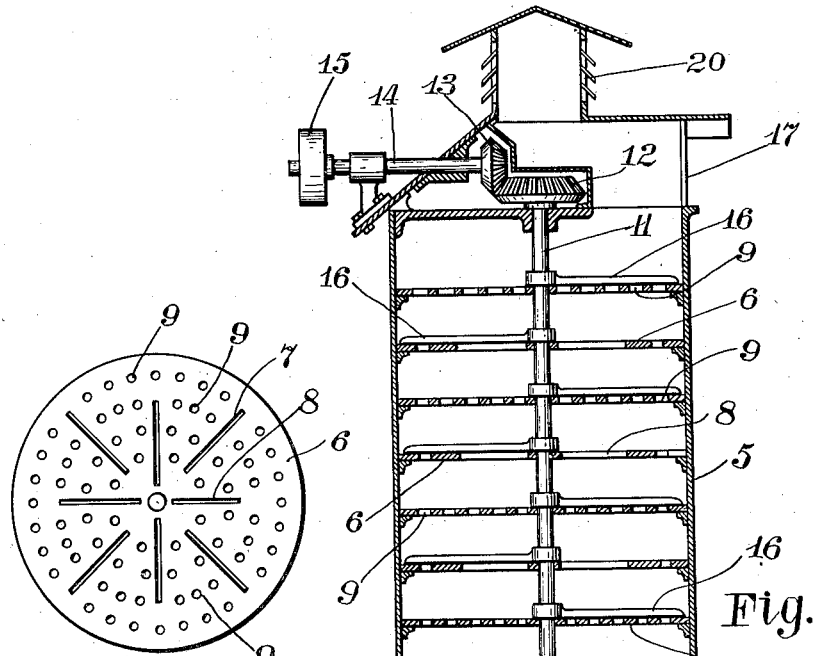
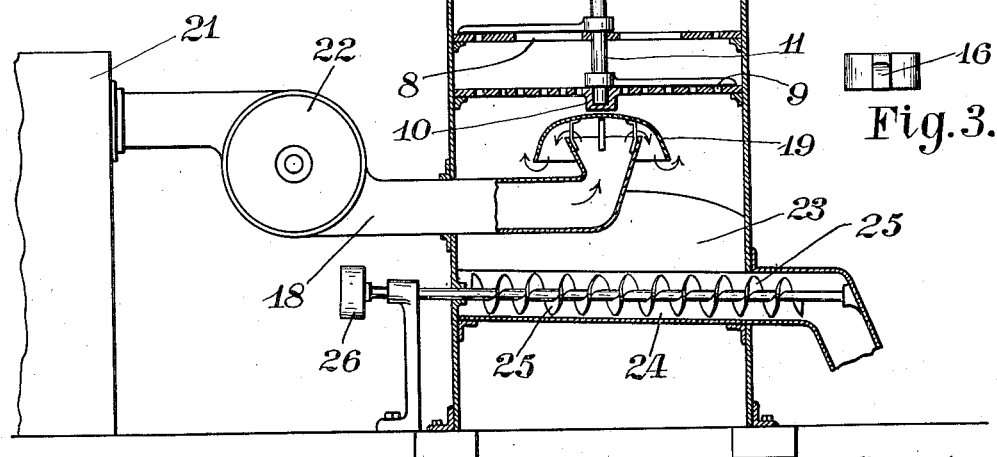
Inventor
OSCAR ERF

UNITED STATES PATENT OFFICE

OSCAR ERF, OF COLUMBUS, OHIO

PROCESS OF TREATING HAY

Application filed July 18, 1927. Serial No. 206,555.

The various plants from which hay is made are in their fresh and natural state, perhaps the ideal cattle food because they contain the enzymes, a catalizer or digestive colloid, and hormones unfermented and minerals unoxidized. In high latitudes the plants in their fresh and natural state are, of course, not available in winter.

The object of the present invention is to preserve hay in such a way as to conserve, in as nearly their natural state as possible, the aforesaid enzymes and hormones and minerals as well as the vitamins, soluble celluloses and sugars and the more digestible proteins so that it may be fed to cattle in winter or other seasons, and in places where the natural feed is not available at all, and with nearly the same results that accrue from feeding fresh hay.

In effecting my said object the hay, especially alfalfa, is taken before the bloom when the enzymatic and important mineral contents are of the highest feeding value. The hay, according to my process, is topped and then cut and crushed in an ordinary feed cutter modified by adding two crushing rolls and then immediately shred and further rolled and shred and dried and cured with heat and monoxide and carbon dioxide gases developed from burning coal or coke. The process referred to is carried out by the apparatus herein shown and described.

My invention, therefore, consists in the process herein described, the feature of novelty being finally claimed.

In the accompanying drawings—

Figure 1 is a somewhat diagrammatic view partly in section and partly in elevation indicating or showing the elements of my apparatus for carrying out the process.

Fig. 2 is a plan view of one of the cutting and shredding disks contained in the drier or tower.

Fig. 3 is an end view of a rubbing blade on a larger scale.

In the views 5 designates a tower which is conveniently circular in horizontal section. Within this tower is a series of disks 6 suitably spaced from one another, each fixed from turning in the tower, and each having two groups of regularly spaced radiating slots 7 and 8 and between them a multiplicity of circular perforations 9 shown as, but not necessarily arranged in concentric circles. The slots are arranged to intersect all the circles of perforations.

Stepped in a bearing 10 in the lowermost disk is a vertical shaft 11 having secured to it at the upper end a bevel gear 12 engaged by a pinion 13 on the inner end of a horizontal shaft 14 extending through the roof of the tower, the outer end of said horizontal shaft being provided with a pulley 15 to receive a belt (not shown) for driving the pinion and turning the vertical shaft 11. Fixed on the shaft 11 is a series of blades 16 extending alternately in opposite directions from the shaft, there being one for each of the disks 6. Each of said blades lies in rubbing contact with the upper side of its companion disk and is adapted, when the shaft 11 is turned, to rub and break such pieces of hay as become lodged in the slots and the perforations. The hay, which at first is comparatively coarse, is introduced through an opening 17 to the upper side of the uppermost disk 6 it being progressively comminuted as it falls from one disk to the next below in the series, the diameters of the slots and perforations being made progressively smaller from the uppermost disk downward. The slots receive the small stems or elongated portions of the hay, they being shred and broken up by the action of the blades when sticking in such slots.

Discharging into the tower below the lowermost disk is a flue 18 the outlet of which is hooded with an inverted circular bowl-shaped member 19 supported in spaced relation to said outlet so that the heat and gases before referred to are at first deflected or dispersed in mushroom fashion at the bottom for flow upward in the chamber through the hay being pulverized. The waste gases escape some through the opening 17 and some through a ventilator at 20. At 21 is shown a fraction only of a suitable coal burner from which leads the flue 18, a suitable blower 22 being interposed in said flue to impel the carboniferous gases and heat through the discharge and up through the hay.

The pulverized hay collects in a hopper 23, the sides of which slope to a cylindric gutter 24 in which turns a feed screw 25 driven by a belt pulley 26 so that the treated hay is delivered to the exterior of the tower for transfer to a place of storage.

The number of the disks 6 may be varied as may also the speed of the blades and the vigor of the heated gases but these should be such as to effect the reduction of the hay to a dry meal in the time required for properly curing the particular variety of hay being treated, such proper curing being determined, generally, by examining or testing the product in the usual way. With externally dry green alfalfa, for example, the temperature of the treating gases should be between 150 and 300 degrees Fah. and the time of the passage of the alfalfa through the tower should be about twenty minutes. More or less creosote is developed from the burning of the coal which creosote permeates the hay and therefore aids in preserving it. The carbon monoxide resulting from the combustion immediately checks fermentive tendency of the hay but such gas promptly evaporates while the creosote remains in the hay.

When the material has been passed through the drier it is sufficiently dry except perhaps in the center of the pieces of some of stem where the fiber still retains some of the original moisture. To remove such moisture I further pulverize with a grinder and sift out the fiber thereby also increasing the percentage of digestible nutrients.

The product of my process and apparatus is a sort of meal with much of the color and odor of the natural plant such color and odor being the sensible symbols of the success of the process; and moreover this meal resists fermentation, mold and oxidation and therefore makes a wholesome and close approximation to natural cattle food greatly relished by cattle and is eminently adapted for winter use, or for use in those regions or places where green food is scarce or cannot be produced at all.

The process can be changed to some extent without departing from the gist of the invention as claimed.

What I claim is:

1. The process of treating green plants constituting cattle feed consisting in topping said plants, promptly subjecting the toppings to a crushing and shredding action and then promptly subjecting them to a pulverizing action together with heat and suitable gases.

2. The process of treating green plants constituting cattle feed consisting in topping said plant, promptly subjecting the toppings to a crushing and shredding action and then promptly subjecting them to a pulverizing action together with heat and carboniferous gases.

3. The process of treating green plants constituting cattle feed consisting in topping said plants, promptly subjecting the toppings to a crushing and shredding action and the promptly subjecting them to a graduated pulverizing action together with heat and suitable gases.

4. The process of treating green plants constituting cattle feed consisting in topping said plants, promptly subjecting said toppings while in the moist state to a crushing and shredding action and then promptly subjecting them to the action of the heat and gases produced by the combustion of carboniferous materials.

OSCAR ERF.